(12) United States Patent
Yokoyama et al.

(10) Patent No.: US 10,754,288 B2
(45) Date of Patent: Aug. 25, 2020

(54) IMAGE FORMING APPARATUS, METHOD FOR CONTROLLING THE SAME, AND RECORDING MEDIUM

(71) Applicant: CANON KABUSHIKI KAISHA, Tokyo (JP)

(72) Inventors: Junnosuke Yokoyama, Toride (JP); Nobuyasu Ito, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/406,833

(22) Filed: May 8, 2019

(65) Prior Publication Data

US 2019/0265633 A1  Aug. 29, 2019

Related U.S. Application Data

(63) Continuation of application No. 15/664,421, filed on Jul. 31, 2017, now Pat. No. 10,310,439, which is a continuation of application No. 14/658,024, filed on Mar. 13, 2015, now Pat. No. 9,746,811.

(30) Foreign Application Priority Data

Mar. 17, 2014  (JP) ................................ 2014-054162
Jun. 18, 2014  (JP) ................................ 2014-125738

(51) Int. Cl.
  *G03G 15/00* (2006.01)
  *G06F 1/3234* (2019.01)
  *G06F 1/3231* (2019.01)

(52) U.S. Cl.
  CPC ......... *G03G 15/80* (2013.01); *G03G 15/5004* (2013.01); *G03G 15/5016* (2013.01); *G06F 1/3231* (2013.01); *G06F 1/3234* (2013.01); *G06F 1/3265* (2013.01); *Y02D 10/173* (2018.01)

(58) Field of Classification Search
  CPC ............... Y02B 60/1289; G03G 15/80; G03G 15/5004; G03G 15/5016
  See application file for complete search history.

(56) References Cited

U.S. PATENT DOCUMENTS

| 2013/0073887 A1* | 3/2013 | Miki ..................... G06F 1/3231 713/323 |
| 2014/0195792 A1* | 7/2014 | Chew .................... G06F 1/3231 713/2 |
| 2014/0215248 A1* | 7/2014 | Cheng ................... G06F 1/3231 713/323 |

FOREIGN PATENT DOCUMENTS

| CN | 102710880 A | 10/2012 |
| JP | 2005242202 A | * 9/2005 |

* cited by examiner

*Primary Examiner* — Ryan D Walsh
(74) *Attorney, Agent, or Firm* — Canon U.S.A., Inc. IP Division

(57) ABSTRACT

An image forming apparatus includes a detection unit that detects a user of the image forming apparatus, a power supply control unit that, when a person approaching the image forming apparatus is detected by the detection unit when the image forming apparatus is in a power saving state where power supply to a function unit included in the image forming apparatus is stopped, activates the function unit while maintaining the display unit in a non-display state, and a display control unit that, when the user of the image forming apparatus instructs the display unit to present display after power is supplied to the function unit by the power supply control unit, changes the display unit to a display state.

48 Claims, 14 Drawing Sheets

FIG.1
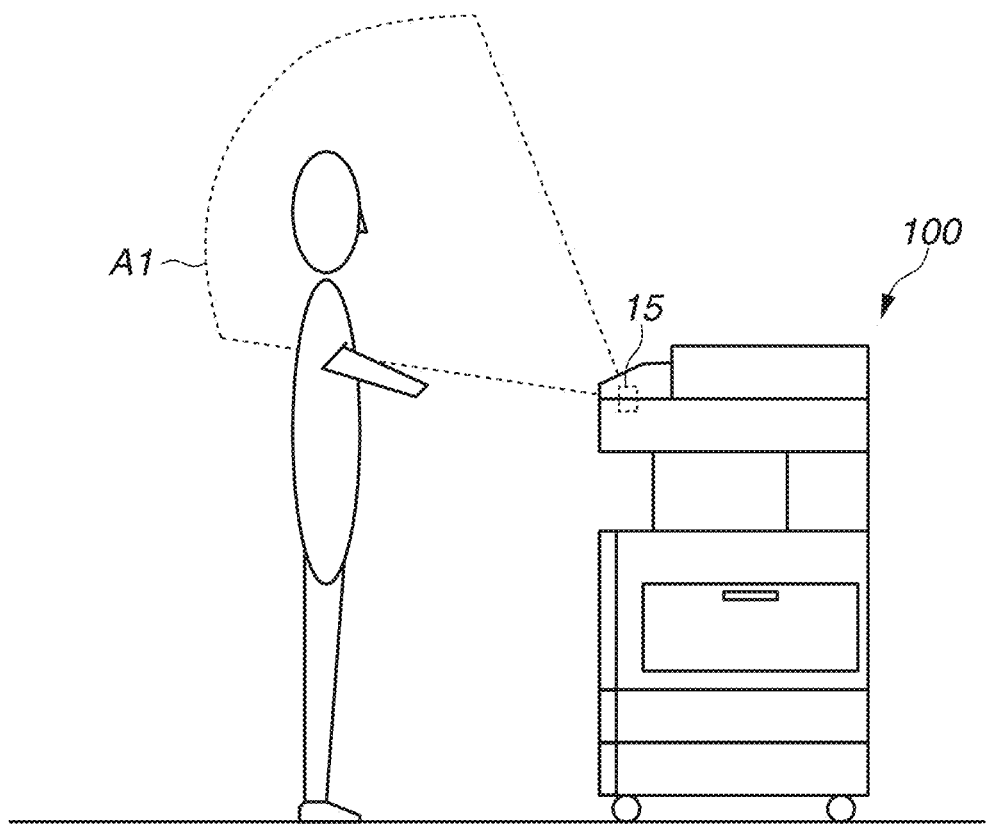
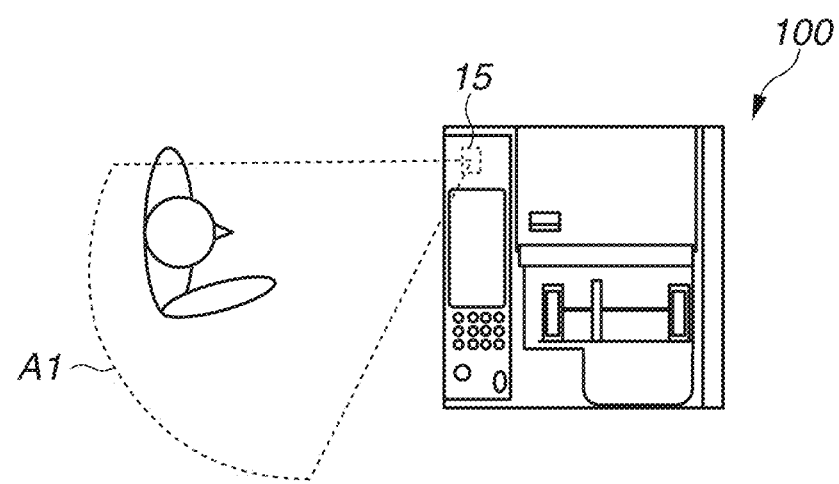

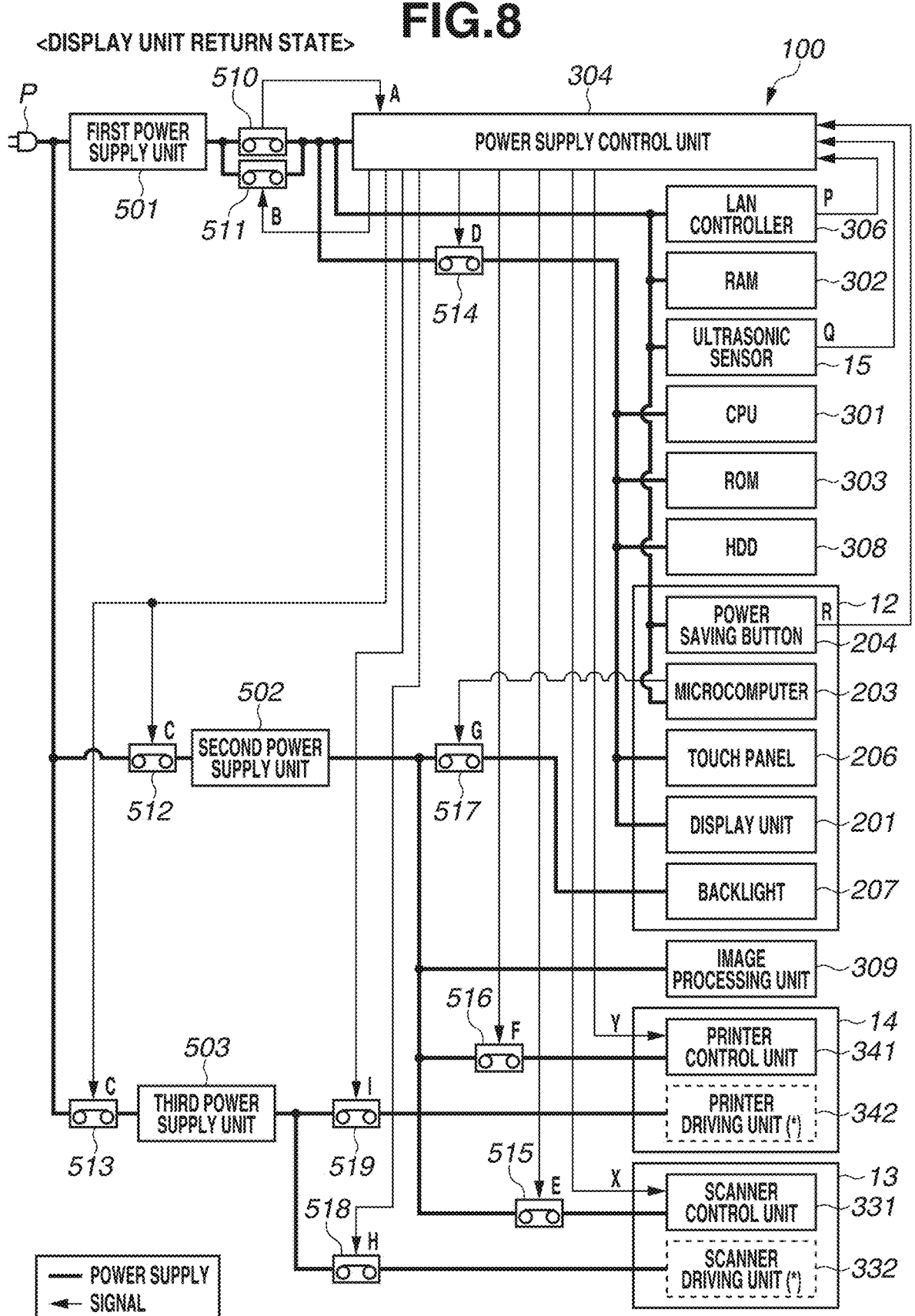

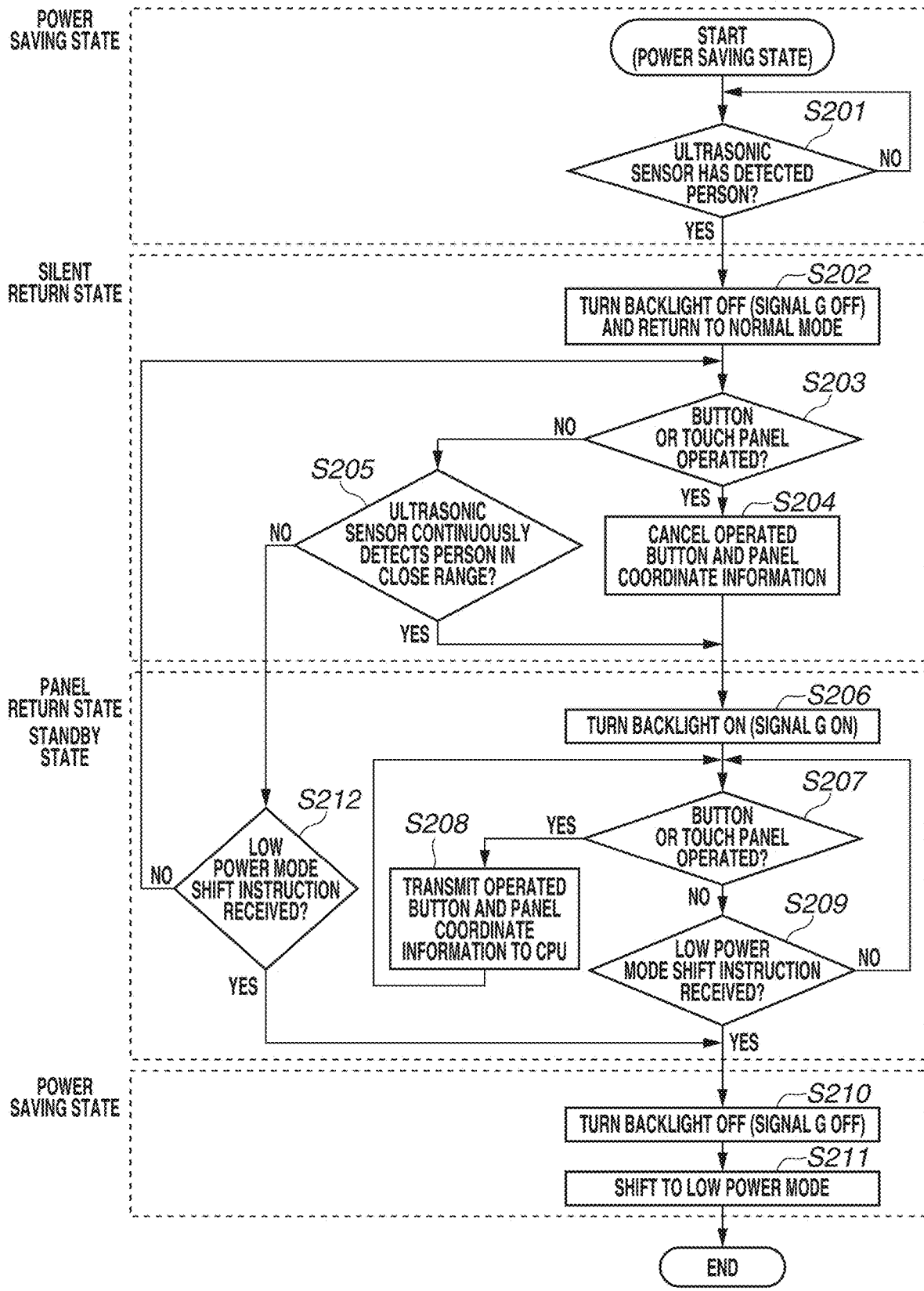

IMAGE FORMING APPARATUS, METHOD FOR CONTROLLING THE SAME, AND RECORDING MEDIUM

CROSS-REFERENCE TO RELATED APPLICATIONS

This application is a continuation, and claims the benefit, of U.S. patent application Ser. No. 15/664,421 filed Jul. 31, 2017, which claims the benefit of U.S. patent application Ser. No. 14/658,024 filed Mar. 13, 2015 (now U.S. Pat. No. 9,746,811), which claims priority to Japanese Patent Application No. 2014-054162 filed Mar. 17, 2014 and to Japanese Patent Application No. 2014-125738 filed Jun. 18, 2014. Each of U.S. patent application Ser. No. 15/664,421, U.S. patent application Ser. No. 14/658,024, Japanese Patent Application No. 2014-054162, and Japanese Patent Application No. 2014-125738 is hereby incorporated by reference herein in its entirety.

BACKGROUND

Field

Aspects of the present invention are generally related to an image forming apparatus including a sensor for detecting a person approaching the image forming apparatus, a method for controlling the image forming apparatus, a program, and a storage medium.

Description of the Related Art

A technique to return an image forming apparatus from a power saving state when a sensor provided in the image forming apparatus detects a person approaching the image forming apparatus, is known (refer to Japanese Patent Application Laid-Open No. 2012-203132).

In the technique discussed in the above-described Japanese Patent Application Laid-Open No. 2012-203132, when a pyroelectric sensor detects a person, a user interface (UI) touch panel lights up. Then, when a user gives instructions to execute a job on the lit-up UI touch panel, the image forming apparatus warms up and its state transitions to a standby state.

However, in the technique discussed in Japanese Patent Application Laid-Open No. 2012-203132, since the UI touch panel lights up when the sensor detects a person, the UI touch panel may light up even when a person who is not a user of the image forming apparatus passes in front of the image forming apparatus.

In the technique discussed in the Japanese Patent Application Laid-Open No. 2012-203132, the image forming apparatus does not warm up until the user gives the instructions to execute a job. More specifically, in the technique discussed in Japanese Patent Application Laid-Open No. 2012-203132, after giving instructions to execute a job, the user has to wait in front of the image forming apparatus until warm-up of the image forming apparatus is completed.

SUMMARY

Aspects of the present invention are generally directed to preventing a display unit from lighting up when a person only passes in front of an image forming apparatus, and to activating the image forming apparatus to shorten a wait time during which a user waits in front of the image forming apparatus before starting job execution.

According to an aspect of the present invention, an image forming apparatus with a display unit includes a detection unit configured to detect a user of the image forming apparatus, a power supply control unit configured to, when a person approaching the image forming apparatus is detected by the detection unit when the image forming apparatus is in a power saving state where power supply to a function unit included in the image forming apparatus is stopped, activate the function unit while maintaining the display unit in a non-display state, and a display control unit configured to, when the user of the image forming apparatus instructs the display unit to present display after power is supplied to the function unit by the power supply control unit, change the display unit to a display state.

Further features of the present disclosure will become apparent from the following description of exemplary embodiments with reference to the attached drawings.

BRIEF DESCRIPTION OF THE DRAWINGS

FIG. 1 illustrates an outer appearance of an image forming apparatus according to a first exemplary embodiment.

FIG. 8 illustrates the image forming apparatus in a display unit return state.

FIG. 14 is a flowchart illustrating processing executed by a microcomputer of the operation unit.

DESCRIPTION OF THE EMBODIMENTS

Exemplary embodiments will be described below with reference to the accompanying drawings.

FIG. 1 illustrates an outer appearance of an image forming apparatus 100 according to a first exemplary embodiment.

The image forming apparatus 100 is a multifunction peripheral (MFP) serving a plurality of functions, such as a print function, a scanner function, a copy function, and a facsimile function.

The image forming apparatus 100 is provided with an ultrasonic sensor 15 for detecting a person approaching the image forming apparatus 100. When the ultrasonic sensor 15 detects a person approaching the image forming apparatus 100, the image forming apparatus 100 returns from the power saving state where the image forming apparatus 100 consumes smaller power than in the standby state where any one of the above-described functions is operative.

The ultrasonic sensor 15 outputs a 40-kHz pulse wave in the non-audio frequency range, and receives a pulse wave reflected by an object. The ultrasonic sensor 15 measures a distance between the image forming apparatus 100 and the object based on a time period since the ultrasonic sensor 15 outputs the pulse wave until it receives the reflection wave. Although, in the above-described example, the ultrasonic sensor 15 is used, an infrared light-receiving sensor for receiving an infrared ray emitted from the human body may be used as long as the sensor can detect a person. Further, instead of the ultrasonic sensor 15, a capacitance sensor for measuring a distance between the sensor and a target object based on the capacitance between the sensor and the target object. Furthermore, instead of the ultrasonic sensor 15, an infrared array sensor having infrared light-receiving elements arranged linearly or in matrix form.

The ultrasonic sensor 15 has a detection area A1 having a fan shape. To detect a person without receiving influence from obstacles, such as a computer placed on a desk, the ultrasonic sensor 15 may be disposed so that a pulse wave is output in the upward direction.

Figure 2:
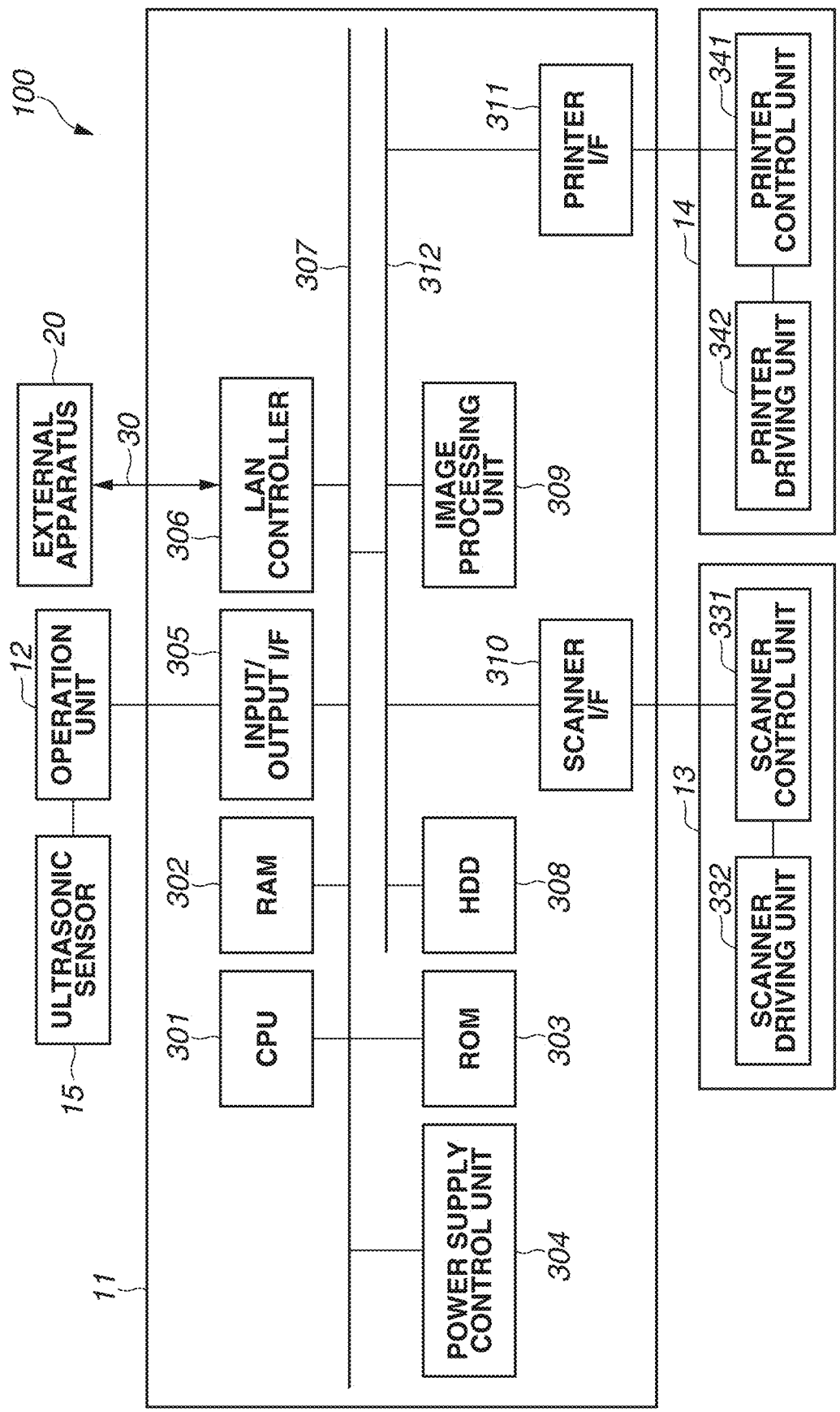
FIG. 2 is a hardware block diagram illustrating the image forming apparatus.

FIG. 2 is a hardware block diagram illustrating the image forming apparatus 100.

A controller 11 for controlling operations of the entire image forming apparatus 100 will be described below with reference to FIG. 2.

As illustrated in FIG. 2, the image forming apparatus 100 includes a controller 11 for comprehensively controlling operations of the image forming apparatus 100, an operation unit 12, a scanner unit 13, a printer unit 14, and the ultrasonic sensor 15.

The controller 11 is connected with the operation unit 12, the scanner unit 13, and the printer unit 14 such that the controller 11 is able to communicate with each unit. The controller 11 includes a central processing unit (CPU) 301, a random access memory (RAM) 302, a read only memory (ROM) 303, a power supply control unit 304, an input/output interface (I/F) 305, and a local area network (LAN) controller 306. The CPU 301, the RAM 302, the ROM 303, the power supply control unit 304, the input/output I/F 305, and the LAN controller 306 are connected to a system bus 307. The controller 11 further includes a hard disk drive (HDD) 308, an image processing unit 309, a scanner I/F 310, and a printer I/F 311. The HDD 308, the image processing unit 309, the scanner I/F 310, and the printer I/F 311 are connected to an image bus 312.

The CPU 301 comprehensively controls access with various devices connected based on a control program stored in the ROM 303, and also comprehensively controls various processing performed by the controller 11. The RAM 302 is a system work memory required for operations of the CPU 301. The RAM 302 also serves as a memory for temporarily storing image data. The ROM 303 stores a boot program of the image forming apparatus 100.

The power supply control unit 304 controls power supply to each unit of the image forming apparatus 100. The power supply control unit 304 will be described in detail below. The input/output I/F 305 is an interface unit for connecting the system bus 307 and the operation unit 12. The input/output I/F 305 receives image data to be displayed on the operation unit 12 from the system bus 307, outputs the image data to the operation unit 12, and outputs information input from the operation unit 12 to the system bus 307. The LAN controller 306 transmits and receives information to/from an external apparatus 20 connected to the network 30.

The HDD 308 is a hard disk drive for storing system software and image data. The image processing unit 309 performs image processing. More specifically, the image processing unit 309 reads image data stored in the RAM 302, and performs image processing, such as enlargement and reduction (for JPEG and JBIG) and color adjustment, on the image data. The scanner I/F 310 is an interface unit for communicating with a scanner control unit 331 of the scanner unit 13. The printer I/F 311 is an interface unit for communicating with a printer control unit 341 of the printer unit 14. The image bus 312 is a transmission line for exchanging image data, and is composed of a peripheral component interconnect (PCI) bus or IEEE 1394.

The scanner unit 13 optically reads an image on a document and generates image data. The scanner unit 13 includes the scanner control unit 331 and a scanner driving unit 332. The scanner driving unit 332 includes a driving unit for moving a reading head for reading a document, and a driving unit for conveying a document to a reading position. The scanner control unit 331 controls operations of the scanner driving unit 332. The scanner control unit 331 receives setting information set by a user at the time of scanner processing through communication with the CPU 301, and controls operations of the scanner driving unit 332 based on the setting information.

The printer unit 14 forms an image on a recording medium (paper) according to the electrophotographic process. The printer unit 14 includes the printer control unit 341 and a printer driving unit 342. The printer driving unit 342 includes motors for rotating photosensitive drums (not illustrated), a mechanism for applying pressure to a fixing unit, and a heater. The printer control unit 341 controls operations of the printer driving unit 342. The printer control unit 341 receives setting information set by a user at the time of printer processing through communication with the CPU 301, and controls operations of the printer driving unit 342 based on the setting information.

Figure 3:
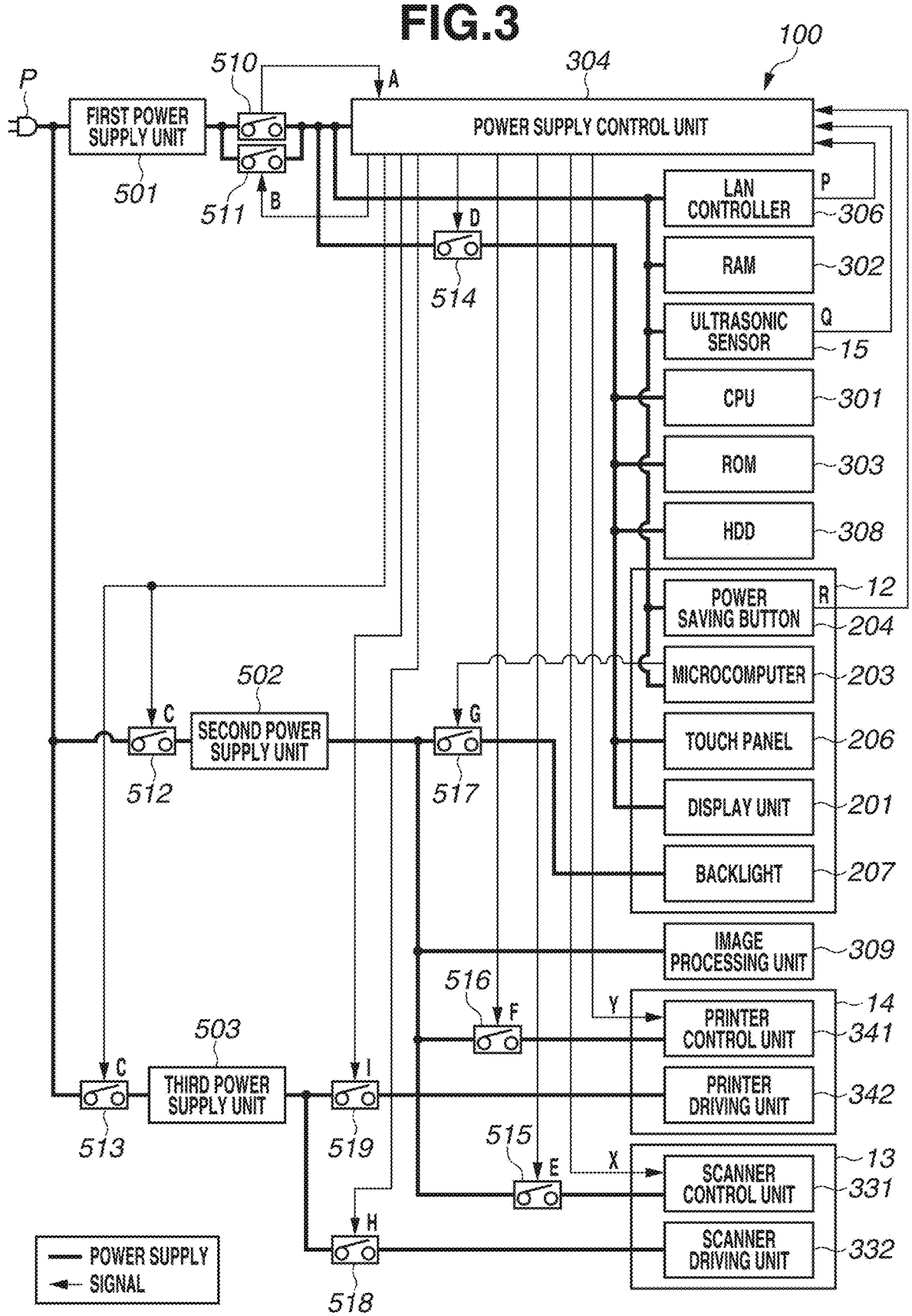
FIG. 3 is a block diagram illustrating power supply in the image forming apparatus.

FIG. 3 is a block diagram illustrating power supply in the image forming apparatus 100.

A power supply configuration of the image forming apparatus 100 will be described below with reference to FIG. 3.

The image forming apparatus 100 includes a first power supply unit 501, a second power supply unit 502, and a third power supply unit 503. The first power supply unit 501 generates direct current (DC) power of about 5.0V from alternating current (AC) power supplied via a plug P. The first power supply unit 501 supplies generated DC power to the LAN controller 306, the RAM 302, the ultrasonic sensor 15, the CPU 301, the ROM 303, and the HDD 308, as well as to a power saving button 204, a microcomputer 203, a touch panel 206, and a display unit 201 of the operation unit 12. Hereinafter, the devices which are supplied with power from the first power supply unit 501 are referred to as first power supply system devices. The second power supply unit 502 generates DC power of about 12.0V from AC power supplied via the plug P. The second power supply unit 502 supplies generated DC power to the backlight 207, the image processing unit 309, the printer control unit 341, and the scanner control unit 331. Hereinafter, the devices which are supplied with power from the second power supply unit 502 are referred to as second power supply system devices. The third power supply unit 503 generates DC power of about 24.0V from AC power supplied via the plug P. The third power supply unit 503 supplies generated DC power to the printer driving unit 342 and the scanner driving unit 332. Hereinafter, the devices which are supplied with power from the third power supply unit 503 are referred to as third power supply system devices.

A seesaw switch 510 is provided between the first power supply unit 501 and the first power supply system devices. The seesaw switch 510 turns ON or OFF according to a user's operation. A relay switch 511 is provided in parallel with the seesaw switch 510. The relay switch 511 supplies power generated by the first power supply unit 501 to the first power supply system devices. Even when the seesaw switch 510 is turned OFF by a user's operation, power is supplied from the first power supply unit 501 to the first power supply system devices via the relay switch 511. The power supply control unit 304 is notified that the seesaw switch 510 is turned OFF via the signal A. When the seesaw switch 510 is turned OFF, the power supply control unit 304 instructs the CPU 301 to execute shutdown processing. Then, when the shutdown processing is executed by the CPU 301, the power supply control unit 304 turns the relay switch 511 OFF. Accordingly, the image forming apparatus 100 turns OFF.

A relay switch 512 is provided between the plug P and the second power supply unit 502. The relay switch 512 enables or disables power supply from the plug P to the second power supply unit 502. A relay switch 513 is provided between the plug P and the third power supply unit 503. The relay switch 513 enables or disables power supply from the plug P to the third power supply unit 503.

A switch 514 is provided between the first power supply unit 501, and the CPU 301, the ROM 303, the HDD 308, the touch panel 206 and the display unit 201. The switch 514 starts or stops power supply to the CPU 301, the ROM 303, the HDD 308, the touch panel 206, and the display unit 201. A switch 515 is provided between the scanner control unit 331 and the second power supply unit 502. The switch 515 starts or stops power supply to the scanner control unit 331. A switch 516 is provided between the printer control unit 341 and the second power supply unit 502. The switch 516 starts or stops power supply to the printer control unit 341.

A switch 517 is provided between the second power supply unit 502 and a backlight 207 which lights up the display unit 201 of the operation unit 12 to visualize screen display. The switch 517 starts or stops power supply to the backlight 207.

A switch 518 is provided between the scanner driving unit 332 and the third power supply unit 503. The switch 518 starts or stops power supply to the scanner driving unit 332. A switch 519 is provided between the printer driving unit 342 and the third power supply unit 503. The switch 519 starts or stops power supply to the printer driving unit 342.

The power supply control unit 304 will be described in detail below.

The power supply control unit 304 is a programmable logic circuit as a rewritable circuit. More specifically, the power supply control unit 304 according to the present exemplary embodiment is a complex programmable logic device (CPLD). Although, in the present exemplary embodiment, the power supply control unit 304 includes a CPLD, the configuration is not limited thereto. The power supply control unit 304 may be a processor such as a CPU, which executes the processing based on software.

The power supply control unit 304 detects a return factor for returning the image forming apparatus 100 from a power saving state ST4. The power supply control unit 304 performs power supply control according to the detected return factor. The above-described return factor includes the following events:

The seesaw switch 510 is turned ON from OFF.

A specific packet (for example, a print job) has been received from the external apparatus 20.

A person has approached the image forming apparatus 100, and the power saving button 204 has been pressed by a user. Signals A, P, Q, and R indicating the above-described return factors are input to the power supply control unit 304. The signal A indicates the (ON/OFF) state of the seesaw switch 510. The signal P indicates that the LAN controller 306 has received a specific packet (for example, a print job) from the external apparatus 20. The signal Q indicates that the ultrasonic sensor 15 detected an object such as a person. The signal R indicates that the power saving button 204 of the operation unit 12 has been pressed by a user.

The power supply control unit 304 outputs signals B, C, D, E, F, H, and I (controls the logic of the signal B, C, D, E, F, H, and I). The signal B turns the relay switch 511 ON or OFF. The signal C turns the relay switches 512 and 513 ON or OFF. The signal D turns the switch 514 ON or OFF. The signal E turns the switch 515 ON or OFF. The signal F turns the switch 516 ON or OFF. The signal H turns the switch 518 ON or OFF. The signal I turns the switch 519 ON or OFF.

When the seesaw switch 510 is turned OFF by a user's operation, the logic of the signal A changes to the Lo level. When the logic of the signal A changes to the Lo level, the power supply control unit 304 instructs the CPU 301 to shut down the image forming apparatus 100. The CPU 301 executes shutdown processing in response to the above-described instruction. The power supply control 340 controls the signals B and C to turn OFF the relay switches 511, 512, and 513. Accordingly, the image forming apparatus 100 can be appropriately turned OFF after the shutdown processing.

When the LAN controller 306 receives a specific packet (a print job) from the external apparatus 20, the logic of the signal P changes to the Hi level. When the logic of the signal P changes to the Hi level, the power supply control unit 304 controls the signals C, D, F, and I to turn ON the relay switches 512, 513, 514, 516, and 519. Accordingly, the printer unit 14 performs printing based on the print job.

When the ultrasonic sensor 15 detects an object such as a person, the logic of the signal Q changes to the Hi level. When the logic of the signal Q changes to the Hi level, the power supply control unit 304 controls the signals C, D, E, F, H, and I to turn ON the switches 512 to 516, 518, and 519.

At this timing, the microcomputer 203 outputs an output signal G with a logic at the Lo level. The signal G can turn the switch 517 ON or OFF. When the logic of the signal G is at the Lo level, the switch 517 turns OFF. Therefore, when the ultrasonic sensor 15 detects an object, the image forming apparatus 100 returns from the power saving state ST4 in a state where power is not supplied to the backlight 207.

When the ultrasonic sensor 15 detects an object such as a person, the power supply control unit 304 changes the logic of signals Y and X to the Hi level.

The signal X is used to select whether the scanner control unit 331 activates the scanner unit 13 together with the drive of the scanner driving unit 332 or not together with the drive of the scanner driving unit 332. If the logic of the signal X is at the Hi level when power is supplied to the scanner control unit 331, the scanner control unit 331 activates the scanner unit 13 while suspending the drive of the scanner driving unit 332 (hereinafter referred to as silent start of the scanner unit 13). If the logic of the signal X is at the Lo level when power is supplied to the scanner control unit 331, the scanner control unit 331 activates the scanner unit 13 together with the drive of the scanner driving unit 332.

The signal Y is used to select whether the printer control unit 341 activates the printer unit 14 together with the drive of the printer driving unit 342 or not together with the drive of the printer driving unit 342. If the logic of the signal X is at the Hi level when power is supplied to the printer control unit 341, the printer control unit 341 activates the printer unit 14 while suspending the drive of the printer driving unit 342 (hereinafter referred to as silent start of the printer unit 14). If the logic of the signal X is at the Lo level when power is supplied to the printer control unit 341, the printer control unit 341 activates the printer unit 14 together with the drive of the printer driving unit 342.

When the user presses the power saving button 204, the logic of the signal R changes to the Hi level. When the logic of the signal R changes to the Hi level, the power supply control unit 304 controls the signals C to I to turn ON the relay switches 512 to 519. When the power saving button 204 is pressed, the power supply control unit 304 changes the logic of the signals Y and X to the Hi level. When the power saving button 204 is pressed, the backlight 207 lights up unlike the above-described case where the ultrasonic sensor 15 detects a person.

The above-described switches 511 to 519 may be semiconductor switches (for example, field effect transistors (FETs)) instead of mechanical switches.

Figure 4:
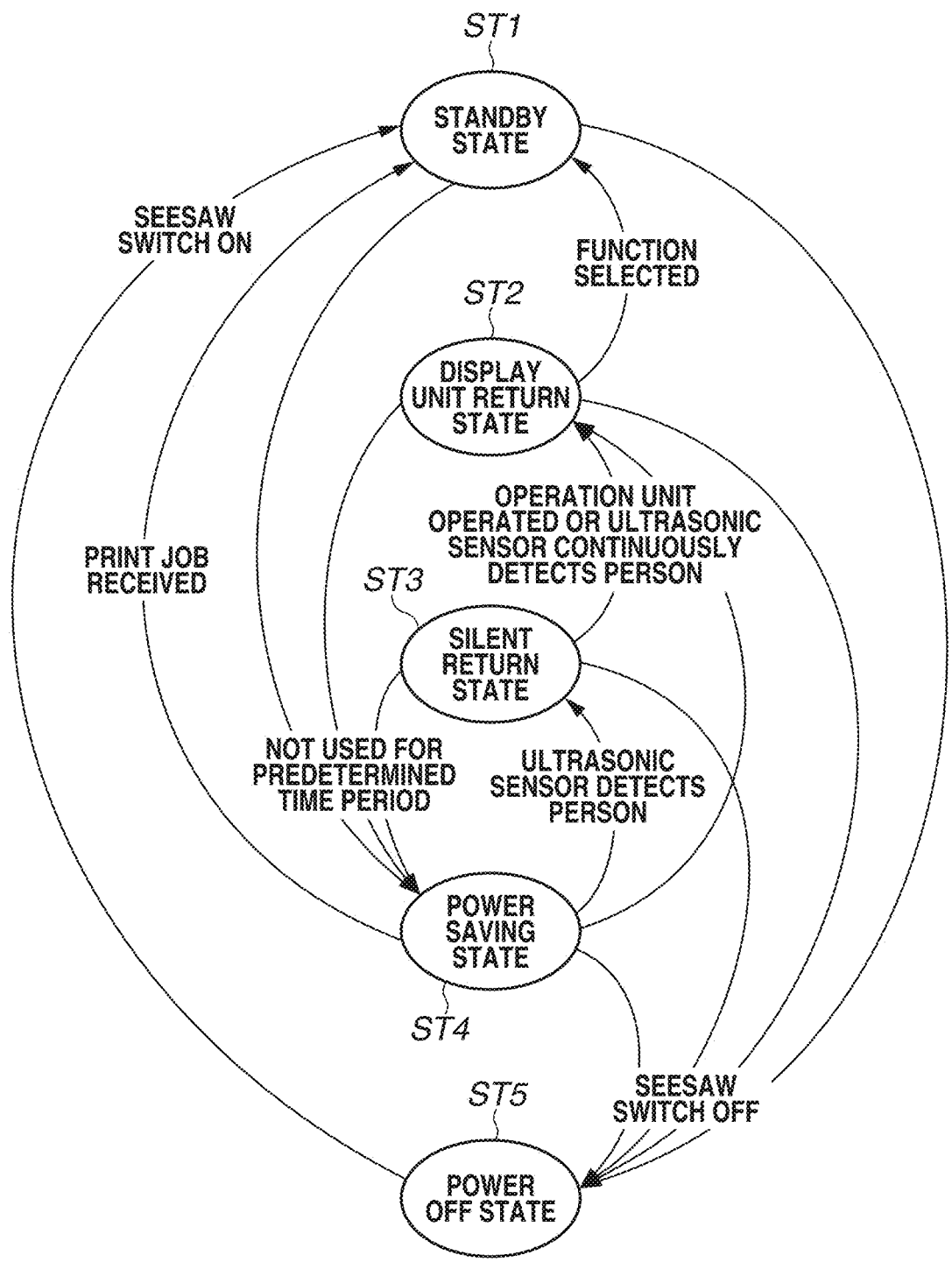
FIG. 4 is a state transition diagram of the image forming apparatus.

FIG. 4 is a state transition diagram of the image forming apparatus 100.

A state transition of the image forming apparatus 100 will be described below with reference to FIG. 4.

The image forming apparatus 100 assumes a standby state ST1, a display unit return state ST2, a silent return state ST3, a power saving state ST4, and a power OFF state ST5.

The standby state ST1 is a state where a reading operation can be performed by the scanner unit 13, and a printing operation can be performed by the printer unit 14.

When the image forming apparatus 100 is not in use for a predetermined period, for example, when the operation unit 12 is not operated for a predetermined period and no job is received from the external apparatus 20 in the standby state ST1, a state of the image forming apparatus 100 transitions from the standby state ST1 to the power saving state ST4. In the power saving state ST4, smaller power is consumed than in the standby state ST1. In the power saving state ST4, power is supplied only to devices (the ultrasonic sensor 15, the LAN controller 306, etc.) which are required to return from the power saving state ST4.

When the ultrasonic sensor 15 detects a person in the power saving state ST4, the state of the image forming apparatus 100 transitions to the silent return state ST3. In the silent return state ST3, the CPU 301, the image processing unit 309 and the HDD 308, of the controller 11, the scanner unit 13, and the printer unit 14 are activated. Both the printer unit 14 and the scanner unit 13 are silently driven. Therefore, the image forming apparatus 100 silently starts. In the above-described activation process, the CPU 301, the image processing unit (application specific integrated circuit (ASIC)) 309, the CPU of the scanner control unit 331, and the CPU of the printer control unit 341 execute initialization. When a print job is received in the power saving state ST4, in which the external apparatus 20 instructs the printer unit 14 to do printing, the state of the image forming apparatus 100 transitions to the standby state ST1.

When the user presses the power saving button 204 or when the ultrasonic sensor 15 continuously detects a person within a close range in the power saving state ST4, the state of the image forming apparatus 100 transitions to the display unit return state ST2 (described below). In the present exemplary embodiment, since the user is supposed to be detected by the ultrasonic sensor 15 before the power saving button 204 is pressed, the power saving button 204 is not to be pressed in the power saving state ST4.

When the user presses the power saving button 204 or when the ultrasonic sensor 15 continuously detects a person within a close range in the silent return state ST3, the state of the image forming apparatus 100 transitions to the display unit return state ST2 where the backlight 207 is lighted up and the display unit 201 is displayed. Accordingly, the user is able to select a function of the image forming apparatus 100 via a main menu screen (selection screen) 201a (refer to FIG. 9B) displayed on the display unit 201.

When the user selects a function of the image forming apparatus 100 via the main menu screen 201a displayed in the display unit return state ST2, the state of the image forming apparatus 100 transitions to the standby state ST1 where the selected function can be executed. For example, when the user selects a print function via the main menu screen 201a, the drive of the printer driving unit 342 is started. More specifically, the pressing of the fixing unit, the heating of the heater, the drive of a polygon mirror, the rotation of various motors, etc. are started. When the user selects a scanner function via the main menu screen 201a, the scanner driving unit 332 drives the scanner unit 13. More specifically, a reading position adjustment operation of a reading unit and the rotation of various motors are started.

When the seesaw switch 510 is turned OFF from ON by a user operation, the state of the image forming apparatus 100 transitions to the power OFF state.

Each of the above-described states will be described in detail below with reference to FIGS. 5 to 8.

Referring to FIGS. 5 to 8, power is not supplied to shaded portions.

Figure 5:
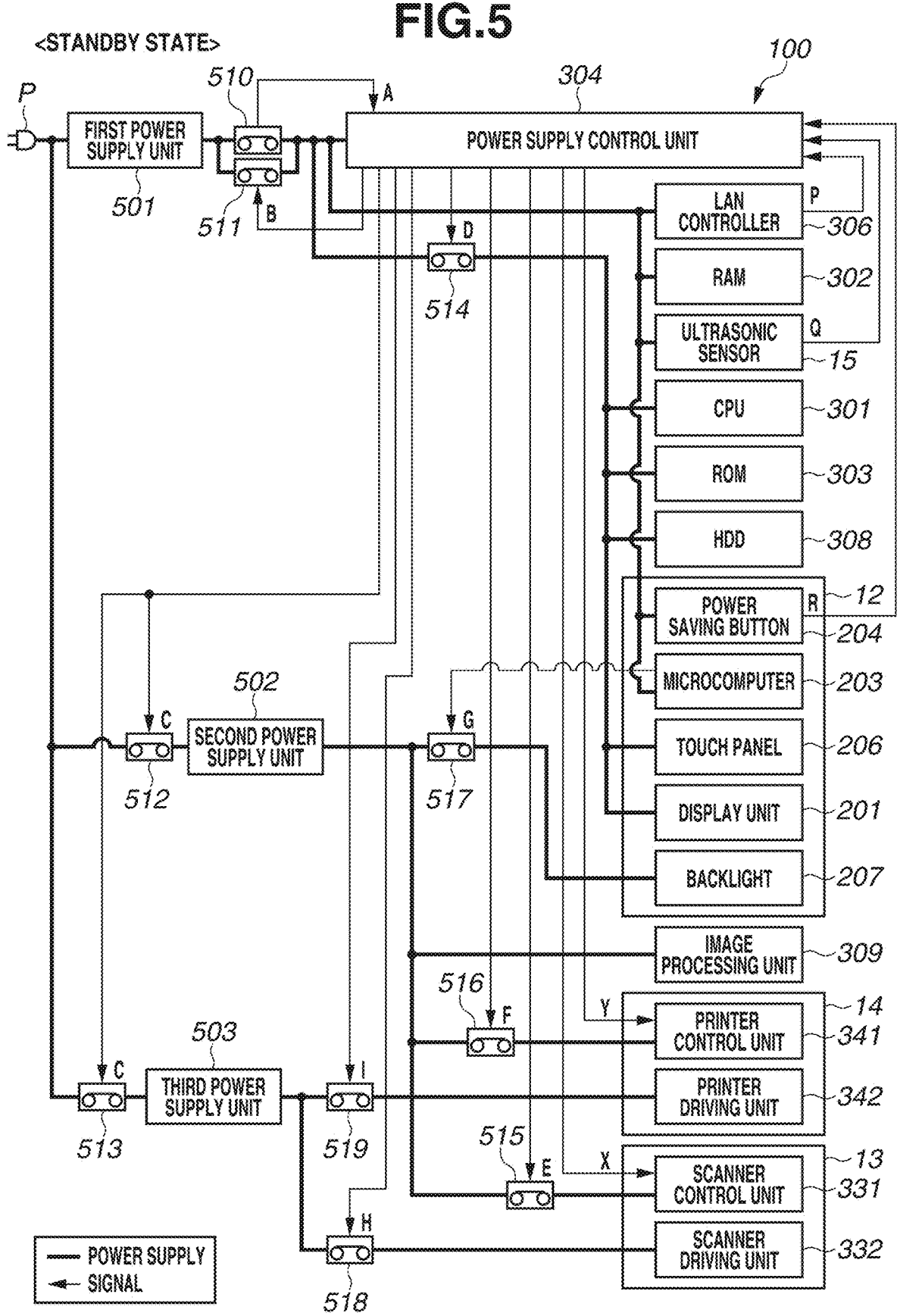
FIG. 5 illustrates the image forming apparatus in a standby state.

As illustrated in FIG. 5, in the standby state ST1, each of the switch 510 to 519 of the image forming apparatus 100 is turned ON, and power is supplied to each unit of the image forming apparatus 100.

Figure 6:
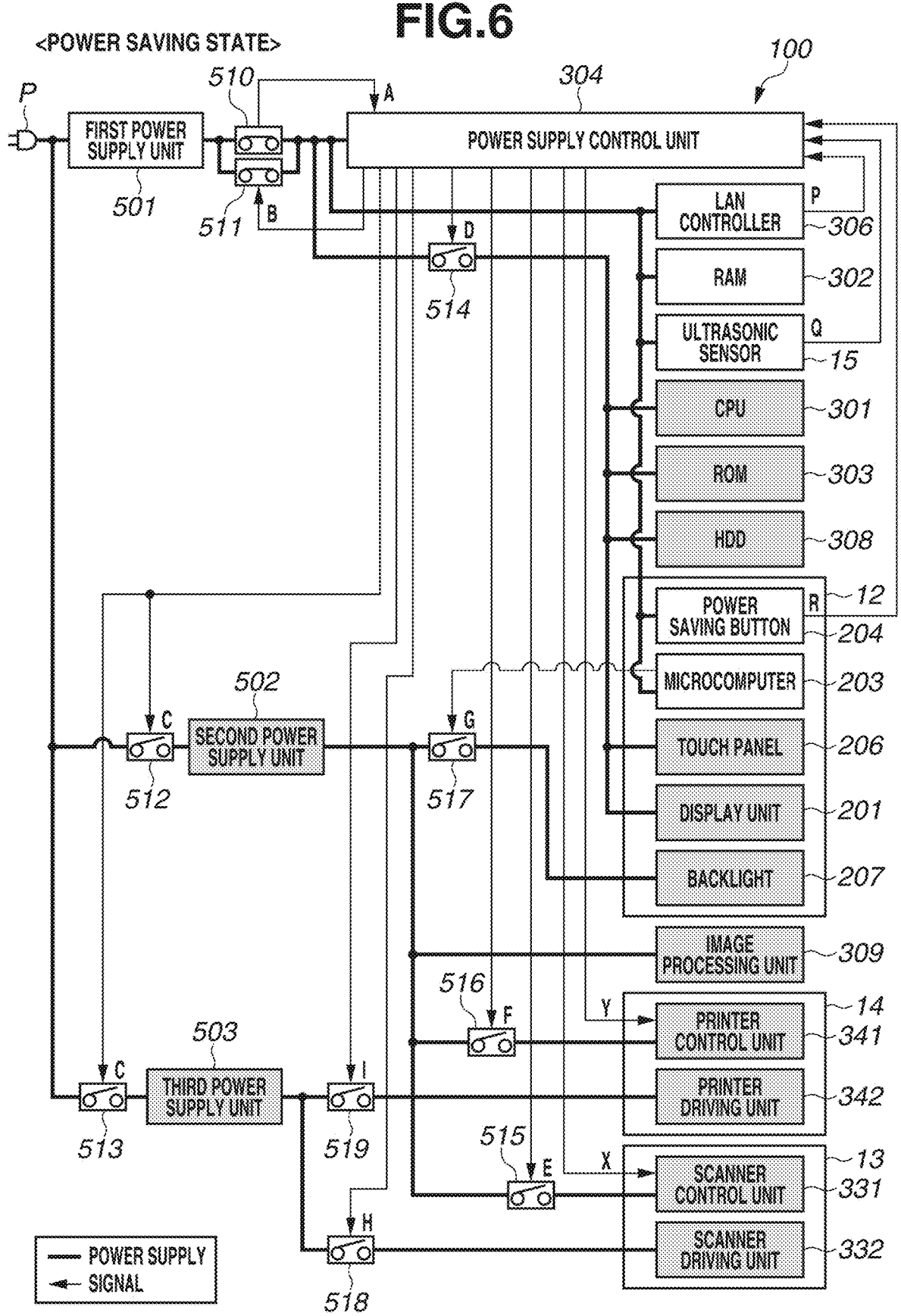
FIG. 6 illustrates the image forming apparatus in a power saving state.

As illustrated in FIG. 6, in the power saving state ST4, power is supplied to some of the first power supply system devices. In the power saving state ST4, the relay switch 511 for supplying power generated by the first power supply unit 501 is turned ON, and other switches 512 to 519 are turned OFF. Accordingly, in the power saving state ST4, power is supplied to the power supply control unit 304, the RAM 302, the LAN controller 306, the ultrasonic sensor 15, the power saving button 204, and the microcomputer 203. Power may be supplied to the microcomputer 203 when the ultrasonic sensor 15 detects a person.

Figure 7:
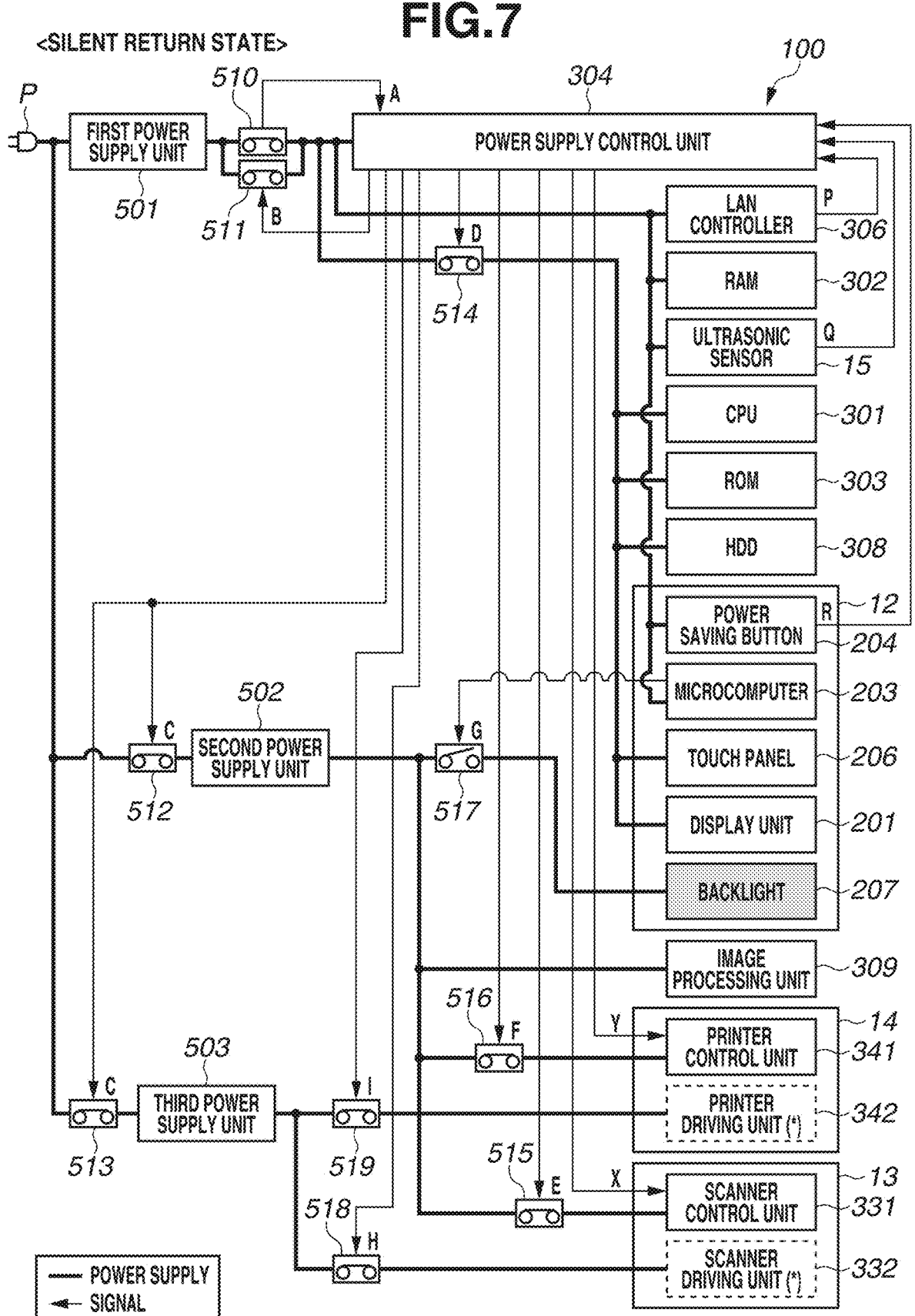
FIG. 7 illustrates the image forming apparatus in a silent return state.

As illustrated in FIG. 7, in the silent return state ST3, power is supplied to the display unit 201, the touch panel 206, the CPU 301, the HDD 308, the ROM 303, the image processing unit 309, the printer unit 14, and the scanner unit 13 in addition to the devices supplied with power in the power saving state ST4. The printer control unit 341 and the scanner control unit 331 do not drive the printer driving unit 342 and the scanner driving unit 332.

As illustrated in FIG. 8, in the display unit return state ST2, power is supplied to the backlight 207 in addition to the devices supplied with power in the silent return state ST3. This state allows the user to recognize that the display unit 201 is displaying various types of information.

Figure 9A:
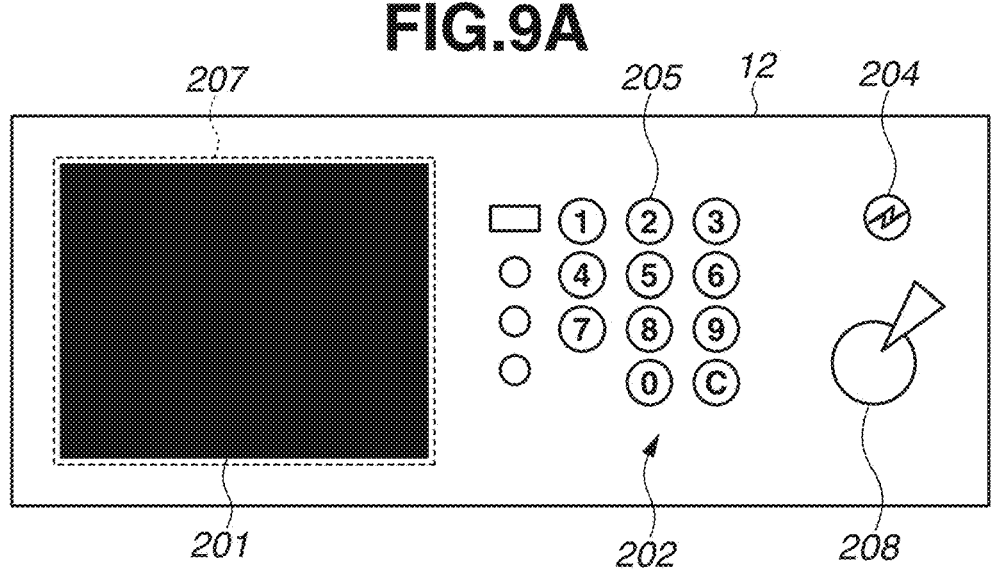
FIGS. 9A, 9B, and 9C illustrate details of an operation unit.
Figure 9B:
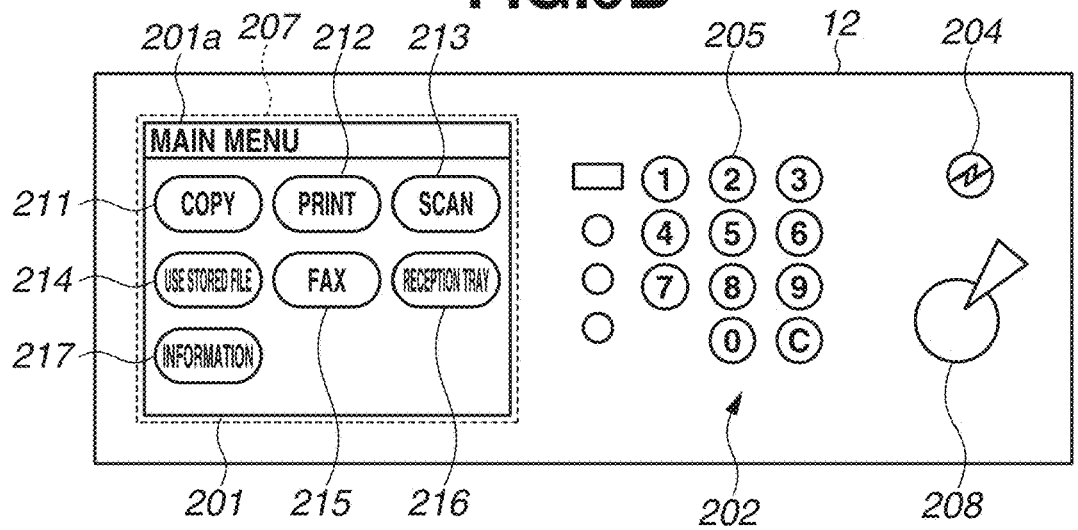
Figure 9C:
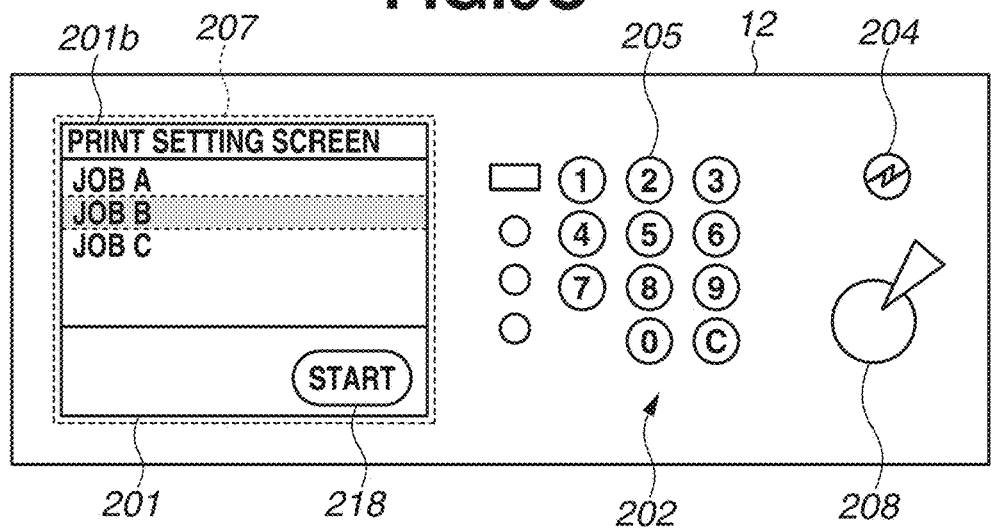

FIGS. 9A, 9B, and 9C illustrate details of the operation unit 12.

As illustrated in FIG. 9A, the operation unit 12 includes the display unit 201, buttons 202, and the microcomputer 203 (refer to FIG. 3).

The display unit 201 displays various types of images. More specifically, the microcomputer (display control unit) 203 displays on the display unit 201 the main menu screen (selection screen) 201a (refer to FIG. 9B) for selecting the copy function, the print function, the scan function, and other functions. The microcomputer 203 displays on the display unit 201 a setting screen 201b (refer to FIG. 9C) for executing a function selected on the main menu screen 201a. To allow the user to see an image displayed on the display unit 201, the microcomputer 203 lights up the backlight 207.

As illustrated in FIG. 9A, in the power OFF state ST5, the power saving state ST4, and the silent return state ST3, no image is displayed on the display unit 201 (non-display state). This non-display state may be either a state where the backlight 207 is turned OFF although an image to be displayed is drawn on the display unit 201 or a state where the display unit 201 is turned OFF and no image is drawn on the display unit 201. On the other hand, as illustrated in FIGS. 9B and 9C, a state where a screen is displayed on the display unit is referred to as a display state.

As illustrated in FIG. 9B, the main menu screen 201a includes a Copy icon 211 for executing the copy function, a Print icon 212 for executing the print function, and a Scan icon 213 for executing the scanner function. The main menu screen 201a further includes a Use Stored File icon 214 for using a file stored in the HDD 308, and a FAX icon 215 for executing the facsimile function. The main menu screen 201a further includes a Reception Tray icon 216 for checking received mails, and an Information icon 217 for displaying various types of information.

As illustrated in FIG. 9C, the setting screen 201b includes a Start button 218 for instructing the image forming apparatus 100 to execute a selected job (JOB B is selected in FIG. 9C).

The buttons 202 include a Start key 208 for the image forming apparatus 100 to start the copy or the scan function. The buttons 202 further include a power saving button 204. If the user presses the power saving button 204 when the image forming apparatus 100 is in the standby state ST1, the state of the image forming apparatus 100 transitions to the power saving state ST4. If the user presses the power saving button 204 when the image forming apparatus 100 is in the power saving state ST4, the state of the image forming apparatus 100 transitions to the standby state ST1. The buttons 202 further include a numeric keypad 205 for inputting the number of copies to be printed and other numeric values.

Figure 10:
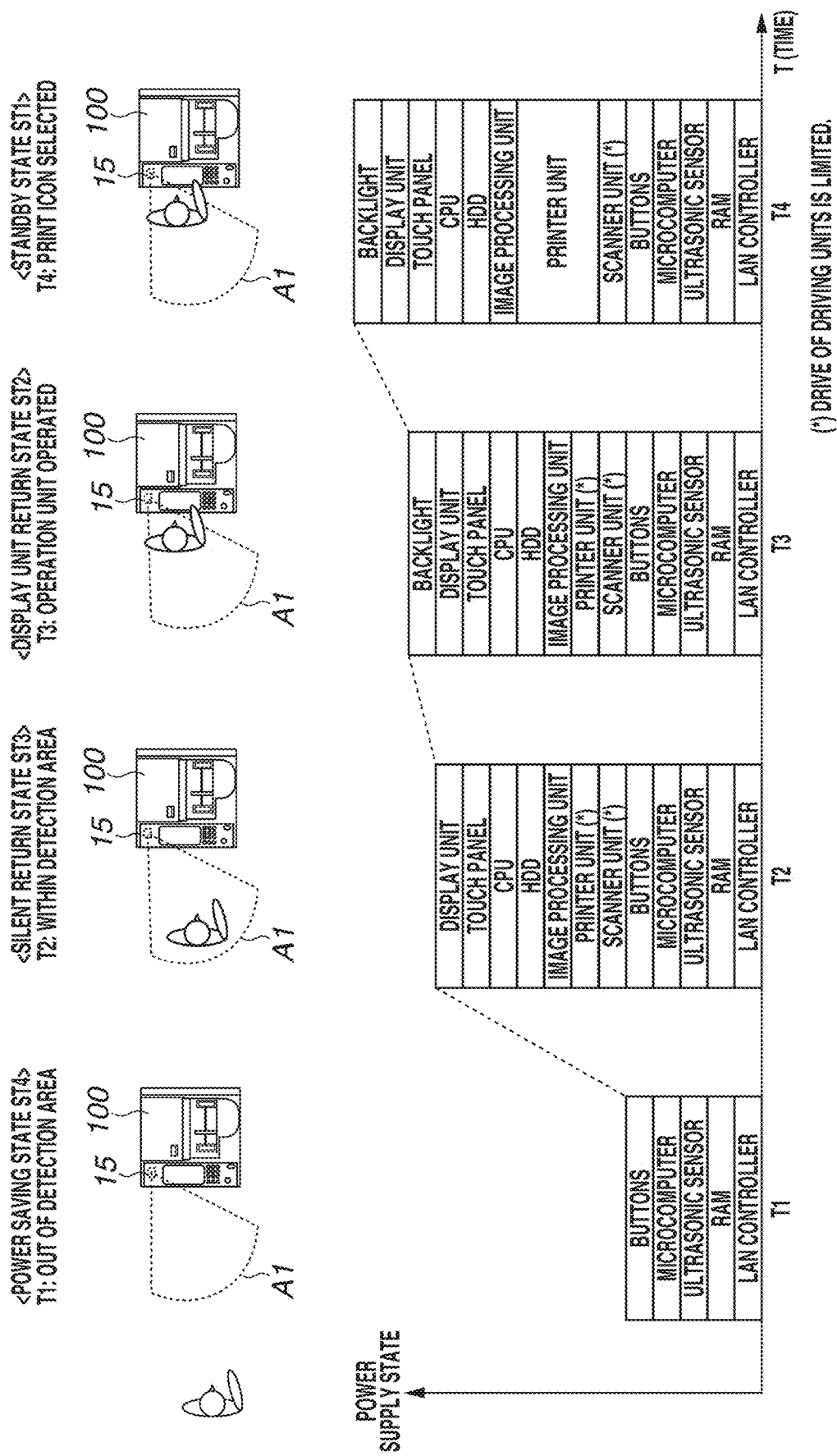
FIG. 10 illustrates power control transition according to a distance between the image forming apparatus and a user.

FIG. 10 illustrates power control transition according to the distance between the image forming apparatus 100 and the user. Referring to FIG. 10, the drawings on the upper side illustrate distances between the image forming apparatus 100 and the user, and the drawings on the lower side illustrate power states of the image forming apparatus 100 when the user is at respective positions illustrated on the upper side.

At a time T1, the user is out of the detection area A1 of the ultrasonic sensor 15, and the image forming apparatus 100 waits in the power saving state ST4. In the power saving state ST4, power is supplied only to limited devices such as the ultrasonic sensor 15. More specifically, in the power saving state ST4, power is supplied to the LAN controller 306, the RAM 302, the ultrasonic sensor 15, the microcomputer 203, and the power saving button 204.

At a time T2, the user enters the detection area A1 of the ultrasonic sensor 15, and the ultrasonic sensor detects the relevant user. Accordingly, power is supplied to the controller 11, etc. More specifically, at the time T2, power is supplied to the display unit 201, the touch panel 206, the scanner unit 13, the printer unit 14, the image processing unit 309, the HDD 308, and the CPU 301 in addition to the devices supplied with power in the power saving state ST4. Accordingly, the activation of the controller 11, the scanner unit 13, and the printer unit 14 is started. However, the scanner control unit 331 does not start the drive of the scanner driving unit 332, and the printer control unit 341 does not start the drive of the printer driving unit 342. Accordingly, the activation of the printer unit 14 and the scanner unit 13 is started without drive sound of the printer driving unit 342 and the scanner driving unit 332.

In the present exemplary embodiment, at the time T2, it is unknown whether the user intends to use the image forming apparatus 100, and therefore power is not supplied to the backlight 207. However, at the time T2, the power saving button 204 lights up or blinks to present to a person who intends to use the image forming apparatus 100, a portion which should be operated next.

At a time T3, the user who has approached the image forming apparatus 100 presses the power saving button 204 or operates the touch panel 206, and power is supplied to the backlight 207 and a screen is displayed on the display unit 201. In the present exemplary embodiment, since the user presses the power saving button 204 and the touch panel 206 to use the image forming apparatus 100, power is supplied to the backlight 207 when the user presses the power saving button 204 or the touch panel 206. When the backlight 207 lights up, the display unit 201 displays the main menu screen 201a for selecting a function (copy, print, scan, box, facsimile, etc.) of the image forming apparatus 100.

At a timing 14, the user selects a function on the main menu screen 201a, and power is supplied to portions required to execute the relevant function. The following describes a case where the user selects the Print icon 212 displayed on the main menu screen 201a. When the user selects the Print icon 212 on the main menu screen 201a, the printer control unit 341 starts the drive of the printer driving unit 342.

Figure 11:
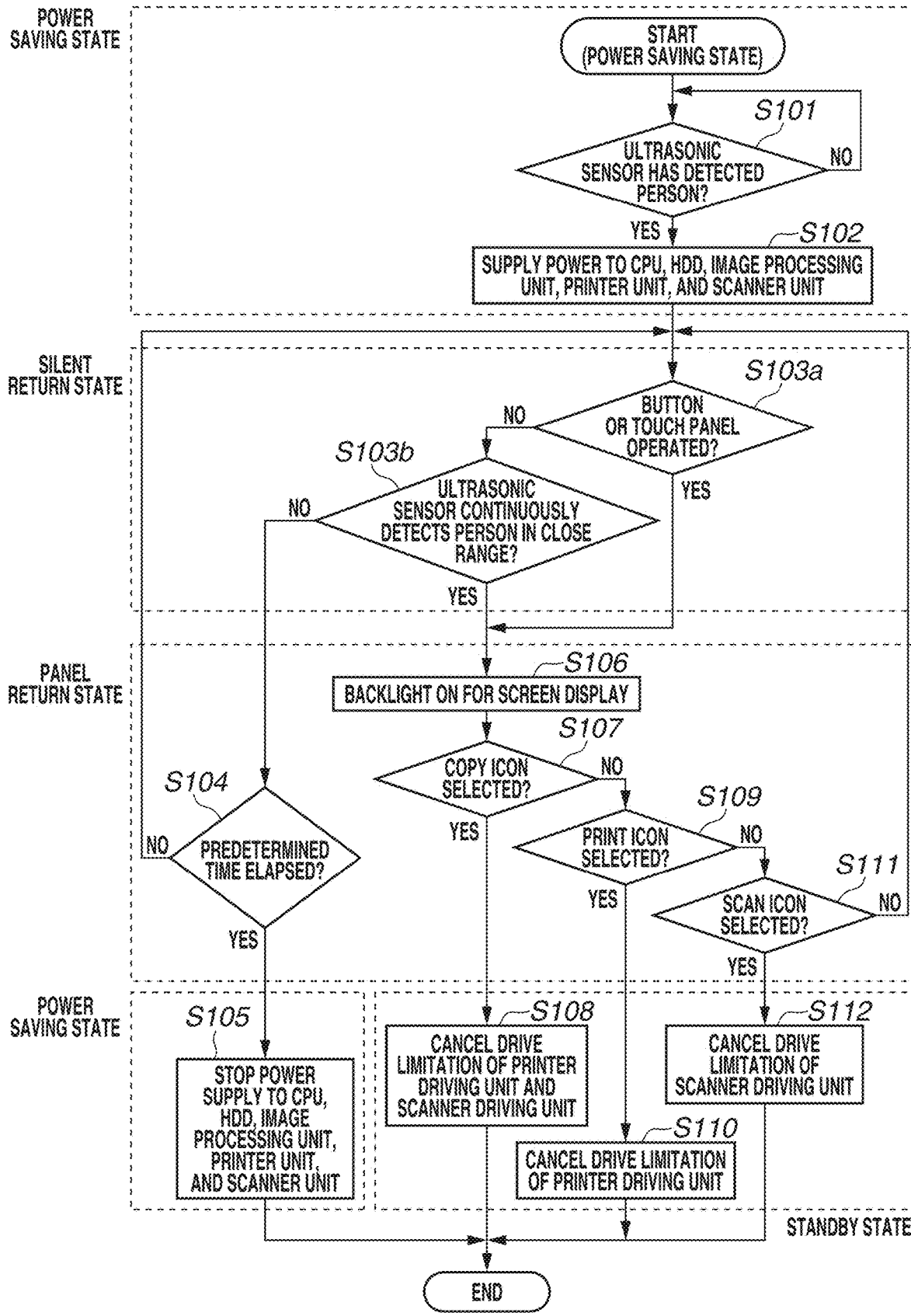
FIG. 11 is a flowchart illustrating power control of the image forming apparatus.

FIG. 11 is a flowchart illustrating processing executed by the microcomputer 203 of the operation unit 12. A series of operations performed by the image forming apparatus 100 to return to the standby state ST1 from the power saving state ST4 will be described below with reference to FIG. 11. Each step of the flowchart illustrated in FIG. 11 is implemented when the microcomputer 203 of the operation unit 12 executes a relevant program.

The image forming apparatus 100 waits in the power saving state ST4.

In step S101, the microcomputer 203 determines whether a person has entered the detection area A1 of the ultrasonic sensor 15. More specifically, upon reception of a signal (output when the ultrasonic sensor 15 detects a person) from the ultrasonic sensor 15, the microcomputer 203 determines that a person has entered the detection area A1 of the ultrasonic sensor 15 (YES in step S101).

When the microcomputer 203 determines that a person has entered the detection area A1 of the ultrasonic sensor 15 (YES in step S101), then in step S102, the microcomputer 203 instructs the power supply control unit 304 to supply power to the CPU 301, the HDD 308, the image processing unit 309, the printer unit 14, and the scanner unit 13. More specifically, the signal Q changes to the Hi level. Upon reception of the above-described instruction, the power supply control unit 304 controls the logic of the signals C, D, E, F, H, and I such that power is supplied to the display unit 201, the CPU 301, the HDD 308, the image processing unit 309, the printer unit 14, and the scanner unit 13. The display unit 201, the CPU 301, the HDD 308, the image processing unit 309, the printer unit 14, and the scanner unit 13 start activation when supplied with power. At this timing, power is not supplied to the backlight 207, and therefore a screen is not displayed on the display unit 201. At this timing, neither the printer driving unit 342 nor the scanner driving unit 332 is driven. Therefore, the above-described activation is not accompanied by drive sound of the printer driving unit 342 and the scanner driving unit 332.

Then, in step S103a, the microcomputer 203 determines whether the power saving button 204 has been pressed, or in step S103b, the microcomputer 203 determines whether the ultrasonic sensor 15 continuously detects a person at a close range. When a predetermined time period has elapsed without detecting the above-described events (YES in step S104), then in step S105, the microcomputer 203 instructs the power supply control unit 304 to stop power supply to the CPU 301, the HDD 308, the image processing unit 309, the printer unit 14, and the scanner unit 13. Upon reception of the above-described instruction, the power supply control unit 304 controls the logic of the signals C, D, E, F, H, and I to stop power supply to the CPU 301, the HDD 308, the image processing unit 309, the printer unit 14, and the scanner unit 13. Accordingly, the state of the image forming apparatus 100 transitions to the power saving state ST4.

On the other hand, when the microcomputer 203 determines that the user has pressed the power saving button 204 or the touch panel 206 before the above-described predetermined time has elapsed (YES in step S103a), then in step S106, the microcomputer 203 turns ON the backlight 207 to display the main menu screen 201a on the display unit 201. Also when the microcomputer 203 determines that the ultrasonic sensor 15 continuously detects a person at a close range (YES in step S103b), in step S106, the microcomputer 203 turns ON the backlight 207 to display the main menu screen 201a on the display unit 201. More specifically, the microcomputer 203 outputs the signal G with the logic at Hi level to turn ON the relay switch 517 to supply power to the backlight 207. When the user selects the Copy icon 211 in the main menu screen 201a (YES in step S107), then in step S108, the microcomputer 203 starts the drive of the printer driving unit 342 and the scanner driving unit 332 required to execute the copy function. Accordingly, the state of the image forming apparatus 100 transitions to the standby state ST1 where the copy function can be executed.

When the user selects the Print icon 212 in the main menu screen 201a (YES in step S109), then in step S110, the microcomputer 203 starts the drive of the printer driving unit 342 required to execute the print function. Accordingly, the state of the image forming apparatus 100 transitions to the standby state ST1 where the print function can be executed.

When the user selects the Scan icon 213 in the main menu screen 201a (YES in step S111), then in step S112, the microcomputer 203 starts the drive of the scanner driving unit 332 required to execute the scan function. Accordingly, the state of the image forming apparatus 100 transitions to the standby state ST1 where the scanner function can be executed.

While, in the above-described example, the Copy icon 211, the Print icon 212, and the Scan icon 213 in the main menu screen 201a are selected, the relevant processing also applies to a case where other icons are selected. When the other icons are selected, power is supplied to a function unit (for example, the facsimile unit) required to execute the function corresponding to the selected icon. For example, when the user selects the FAX icon 215 in the main menu screen 201a, power is supplied to the scanner unit 13 required to perform facsimile transmission.

As described above, in the first exemplary embodiment, when the ultrasonic sensor 15 detects a person, the microcomputer 203 activates a device for executing a function of the image forming apparatus 100. More specifically, in the first exemplary embodiment, since device activation can be started before the user determines a function to be used, device activation is already completed when the user selects a function to be used. Therefore, the user is able to execute the selected function without waiting for device activation.

Further, in the first exemplary embodiment, when the ultrasonic sensor 15 detects a person, power is not supplied to the backlight 207 and therefore the display unit 201 does not light up. For this reason, the display unit 201 does not light up when a person only passes through the inside of the detection range A1 of the ultrasonic sensor 15.

Furthermore, in the first exemplary embodiment, when the ultrasonic sensor 15 detects a person, neither the scanner driving unit 332 nor the printer driving unit 342 is driven and therefore drive sound can be prevented from being generated each time a person passes by.

Figure 12:
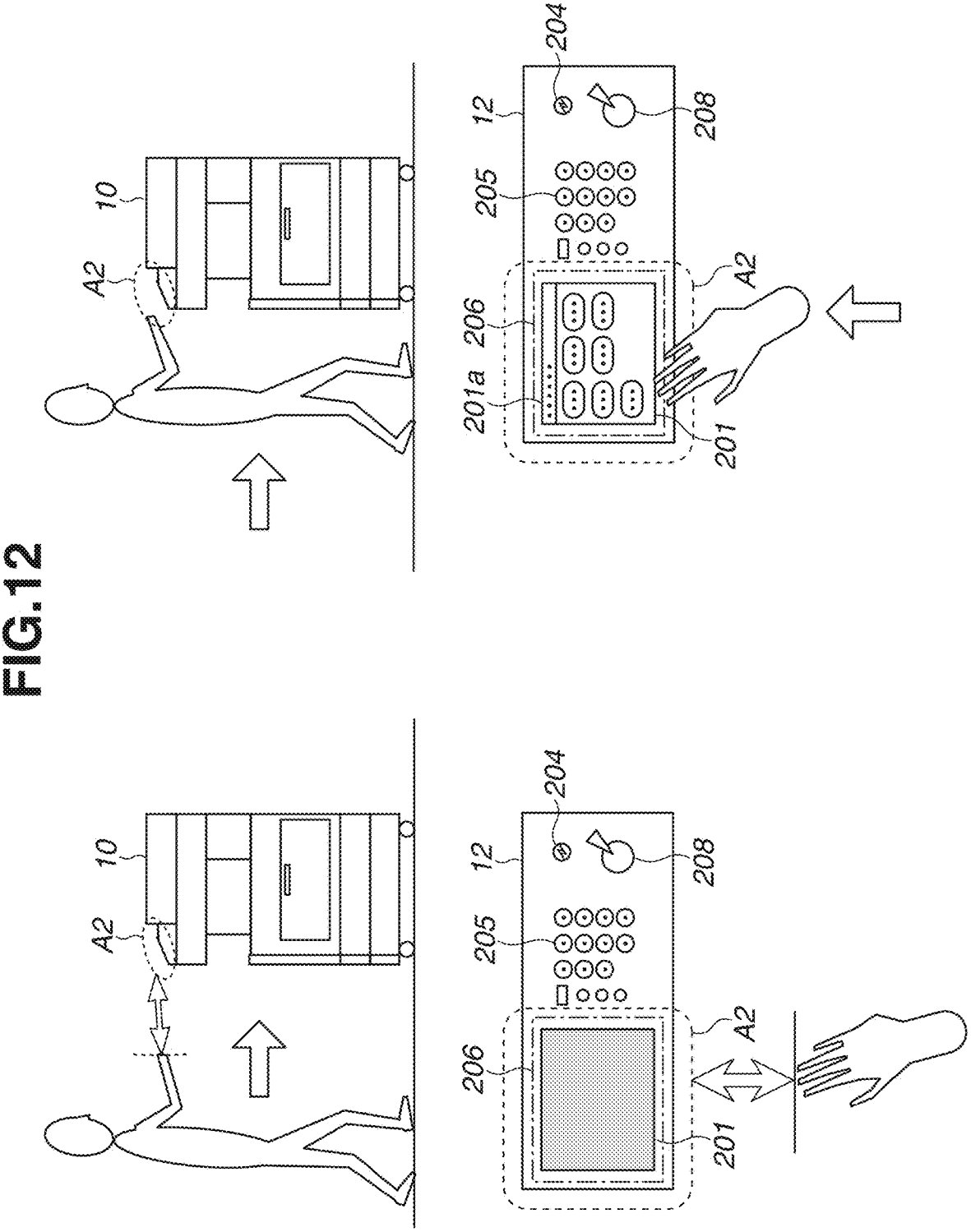
FIG. 12 illustrates a state where the user brings the hand above the operation unit of the image forming apparatus.

FIG. 12 illustrates a state where the user brings the hand above the display unit 201 of the image forming apparatus 100.

As illustrated in FIG. 12, the operation unit 12 includes a capacitance sensor for the touch panel 206. This capacitance sensor detects an approach of a person according to the capacitance of a capacitor formed between the hand of the person approaching the operation unit 12 and the capacitance sensor. When the person's hand enters a detection area A2 of the capacitance sensor, power is supplied to the backlight 207, and the main menu screen 201a is displayed on the display unit 201.

Figure 13:
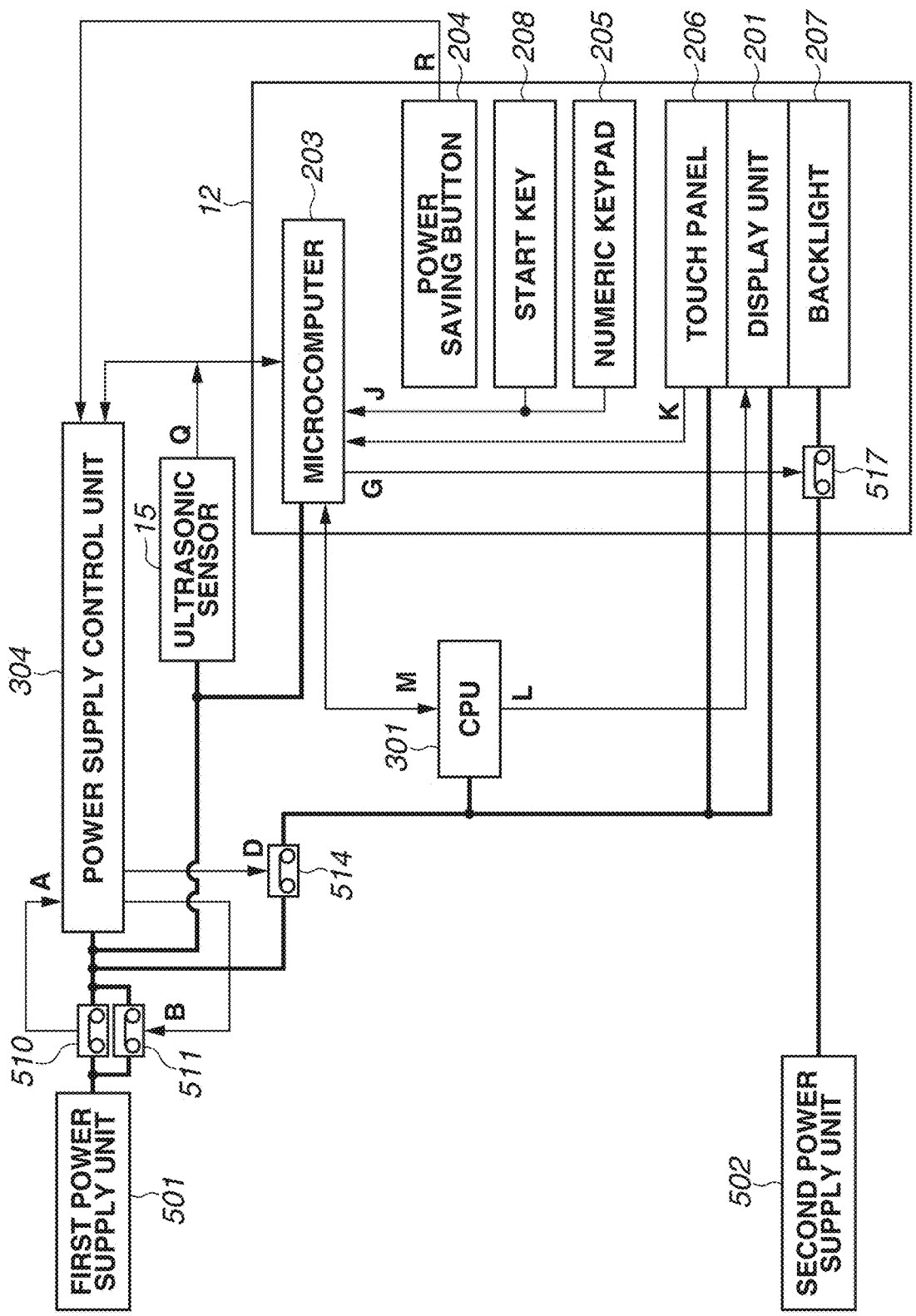
FIG. 13 is a hardware block diagram illustrating the operation unit of an image forming apparatus according to a second exemplary embodiment.

FIG. 13 is a hardware block diagram illustrating the operation unit of an image forming apparatus 100 according to a second exemplary embodiment. The microcomputer 203 is connected to the ultrasonic sensor 15, the touch panel 206, the backlight 207, and the buttons 202. A signal Q is a detection signal of the ultrasonic sensor 15 which is output from the ultrasonic sensor 15 to the microcomputer 203. When a person is detected within a predetermined range, an analog signal may be output from the ultrasonic sensor 15 through an amplifier or a comparator, or an analog signal may be directly input to the microcomputer 203. The signal Q from the ultrasonic sensor 15 enables the microcomputer 203 to know the distance to a person. Upon detection of a signal J, the microcomputer 203 determines that the Start key 208 or the numeric keypad 205 has been pressed. When the Start key 208 or the numeric keypad 205 is pressed, the signal J changes to the logic Lo level. Upon reception of a signal K, the microcomputer 203 determines that the touch panel 206 has been touched and what position is detected in 2-dimensional coordinates of the touch panel 206. When the user touches the touch panel 206, the microcomputer 203 notifies the CPU 301 of coordinate data of the touched position via a serial communication line M. Then, the CPU 301 determines the coordinates of the touched position and transmits the following screen data corresponding to the touch to the display unit 201 via a data signal L.

FIG. 14 is a flowchart illustrating processing executed by the microcomputer 203 of the operation unit 12. The following describes operations executed by the microcomputer 203 when the state of the image forming apparatus 100 transitions to the silent return state ST3 and the display unit return state ST2 from the power saving state ST4.

The microcomputer 203 has a plurality of operation modes (power states). In the power saving state ST4, the microcomputer 203 operates in a low power mode in which the microcomputer 203 only periodically polls the connection signal Q from the ultrasonic sensor 15. The signal Q may be a reflection wave signal output by the ultrasonic sensor 15 or an interrupt signal output when the time interval until the reflection wave returns is shorter than a threshold value preset in a circuit. In the present case, the signal Q is acquired by performing A/D conversion on the reflection wave signal. In step S202, the microcomputer 203 polls the signal Q from the ultrasonic sensor 15 at intervals of 100 milliseconds (ms). When the time interval indicates a preset distance or shorter, the microcomputer 203 returns the operation mode (power state) to the normal operation with the signal G turned OFF. In step S203, the microcomputer 203 periodically checks whether the button 202 or the touch panel 206 has been operated. When the button 202 or the touch panel 206 has been operated (YES in step S203), then in step S204, the microcomputer 203 cancels the operated button and panel coordinate. The reason why the microcomputer 203 cancels the relevant information is that the information is based not on a button or panel operation intentionally performed by the user to return from the sleep mode, but on an unintentional operation in a case a notification is made to the CPU 301. Immediately after that, in step S206, the microcomputer 203 turns ON the signal G and then turns ON the backlight 207.

On the other hand, even when neither the button 202 nor the touch panel 206 is operated (NO in step S203), in a case where the ultrasonic sensor 15 continuously detects a person within a close range during a time period of about 500 ms (YES in step S205), in step S206, the microcomputer 203 turns ON the signal G and then turns ON the backlight 207. When the button 202 or the touch panel 206 is operated after turning ON the backlight 207 (YES in step S207), then in step S208, the microcomputer 203 notifies the CPU 301 of the operated button and panel coordinate. When neither the button 202 nor the touch panel 206 is operated after turning ON the backlight 207, the microcomputer 203 receives a low power mode shift instruction from the CPU 301 via the serial communication line M. When the instruction has been received (YES in step S209), then in step S210, the microcomputer 203 turns OFF the signal G and then turns OFF the backlight 207. In step S211, the image forming apparatus 100 changes the operation mode to the low power mode.

Although, in the present exemplary embodiment, the microcomputer 203 cancels the button operated or the panel coordinate touched while the backlight 207 is turned OFF, and then turns ON the backlight 207, the processing is not limited thereto. The microcomputer 203 may notify the CPU 301 of the operated button and panel coordinate and then the CPU 301 may cancel them.

OTHER EMBODIMENTS

Although, in the first exemplary embodiment, the ultrasonic sensor 15 is used, a camera may be used instead of the ultrasonic sensor 15. Instead of using a camera provided on the image forming apparatus 100, a camera (for example, a monitoring camera) provided in a room where the image forming apparatus 100 is installed may be used.

Although, in the second exemplary embodiment, the main menu screen 201a is displayed on the display unit 201 by using a capacitance sensor 250, a touch-panel sensor of the display unit 201 may be used instead of the capacitance sensor 250.

Although the above-described exemplary embodiments are applied to an image forming apparatus, additional exemplary embodiments are applicable to various apparatuses, such as a (desktop or laptop) personal computer, a personal digital assistant (PDA), a mobile phone, a tablet, a smart phone, and a camera.

Further, the above-described processing in flowcharts can be executed by one processor or a plurality of processors operating in collaboration.

Functions described in flowcharts in the present exemplary embodiment can be implemented by executing software (program) acquired via a network or various types of storage media with a processing unit (a CPU or a processor) such as a personal computer.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. A printing apparatus comprising:
   a device;
   a display unit;
   a user operation detection unit which detects a user touch operation to the display unit;
   a human detection unit which detects a human; and
   a power control unit which supplies power to the device without displaying information on the display unit based on a detection of a human by the human detection unit, wherein the display unit displays information based on a detection of the user touch operation by the user operation detection unit, and wherein the display unit does not display information based on a detection of a human by the human detection unit.

2. The printing apparatus according to claim 1, further comprising a motor, wherein the motor is not driven on based on a detection result of the human detection unit.

3. The printing apparatus according to claim 1, wherein the display unit displays a predetermined screen based on the detection of the user touch operation by the user operation detection unit.

4. The printing apparatus according to claim 3, further comprising a print unit which prints image on a medium,
wherein a predetermined device of the print unit is driven based on a detection of the user touch operation by the user operation detection unit.

5. The printing apparatus according to claim 4, wherein the predetermined device of the print unit is driven before a print instruction to execute printing is received.

6. The printing apparatus according to claim 4, wherein the predetermined device of the print unit is not driven based on a detection of a human by of the human detection unit.

7. The printing apparatus according to claim 4, wherein the predetermined device of the print unit is a fixing unit.

8. The printing apparatus according to claim 4, wherein the predetermined device of the print unit is a heater.

9. The printing apparatus according to claim 4, wherein the predetermined device of the print unit is a polygon mirror.

10. The printing apparatus according to claim 4, wherein the predetermined device of the print unit is a motor.

11. The printing apparatus according to claim 4, wherein the predetermined device of the print unit is driven based on the detection of a user touch operation for a predetermined button on the predetermined screen is detected.

12. The printing apparatus according to claim 11,
wherein the predetermined screen is a menu screen including at least a copy button for executing a copy function and a scan button for executing a scan function, and
wherein the predetermined button is the copy button.

13. The printing apparatus according to claim 1, wherein the device is a CPU or a HDD.

14. The printing apparatus according to claim 1, wherein the display unit includes a backlight, and turning on the display unit comprises lighting up the backlight.

15. The printing apparatus according to claim 1, wherein the human detection unit is an ultrasonic sensor.

16. The printing apparatus according to claim 1, wherein the human detection unit is an infrared sensor.

17. The printing apparatus according to claim 1, wherein the human detection unit is a capacitance sensor.

18. The printing apparatus according to claim 1, wherein the human detection unit is a camera.

19. The printing apparatus according to claim 1, wherein the human detection unit detects a human approaching the printing apparatus.

20. The printing apparatus according to claim 1, wherein the user operation detection unit is a touch sensor.

21. A method of turning on a device of a printing apparatus comprising the device, a display unit which displays an image, a user operation detection unit which detects a user touch operation to the display unit, and a human detection unit which detects a human, wherein the display unit does not display information based on a detection of a human by the human detection unit, the method comprising:
detecting a human;
detecting a user touch operation to the display unit;
supply power to the device without displaying information on the display unit based on the detecting the human; and
displaying information on the display unit based on the detecting the user touch operation to the display unit.

22. The method according to claim 21, wherein a motor of the printing apparatus is not driven on based on a detecting the human.

23. The method according to claim 21, further comprising;
driving a predetermined device of a print unit which prints image on a medium based on detecting a user touch operation to the display unit.

24. The method according to claim 21, wherein the device is a CPU or a HDD.

25. A printing apparatus comprising:
a display unit which display an image;
a user operation detection unit which detects a user touch operation to the display unit;
a human detection unit which detects a human; and
a power state shift unit which shifts a power state of the printing apparatus from a first power state to a second power state higher power consumption than the first power state based on a detection of a human by the human detection unit and shifts the power state of the printing apparatus from the second power state to a third power state higher power consumption than the second power state based on a detection of the user touch operation by the user operation detection unit,
wherein a shift of the power state of the printing apparatus from the second power state to a third power state is not performed based on a detection of a human by the human detection unit.

26. The printing apparatus according to claim 25, further comprising a motor, wherein the motor is not driven on based on a detection of a human by the human detection unit.

27. The printing apparatus according to claim 25, further comprising a display unit which displays a predetermined screen based on the detection of the user touch operation by the user operation detection unit.

28. The printing apparatus according to claim 27, further comprising a print unit which prints image on a medium,
wherein a predetermined device of the print unit is driven based on a detection of the user touch operation by the user operation detection unit.

29. The printing apparatus according to claim 28, wherein the predetermined device of the print unit is driven before a print instruction to execute printing is received.

30. The printing apparatus according to claim 28, wherein the predetermined device of the print unit is not driven based on a detection of a human by the human detection unit.

31. The printing apparatus according to claim 28, wherein the predetermined device of the print unit is a fixing unit.

32. The printing apparatus according to claim 28, wherein the predetermined device of the print unit is a heater.

33. The printing apparatus according to claim 28, wherein the predetermined device of the print unit is a polygon mirror.

34. The printing apparatus according to claim 28, wherein the predetermined device of the print unit is a motor.

35. The printing apparatus according to claim 28, wherein the predetermined device of the print unit is driven based on the detection of a user touch operation for a predetermined button on the predetermined screen is detected.

36. The printing apparatus according to claim 35,
wherein the predetermined screen is a menu screen including at least a copy button for executing a copy function and a scan button for executing a scan function, and
wherein the predetermined button is the copy button.

37. The printing apparatus according to claim 25, wherein the printing apparatus controls power of a device that is a CPU or a HDD.

38. The printing apparatus according to claim 25, wherein the display unit includes a backlight, and turning on the display unit comprises lighting up the backlight.

39. The printing apparatus according to claim 25, wherein the human detection unit is an ultrasonic sensor.

40. The printing apparatus according to claim 25, wherein the human detection unit is an infrared sensor.

41. The printing apparatus according to claim 25, wherein the human detection unit is a capacitance sensor.

42. The printing apparatus according to claim 25, wherein the human detection unit is a camera.

43. The printing apparatus according to claim 25, wherein the human detection unit detects a human approaching the printing apparatus.

44. The printing apparatus according to claim 25, wherein the user operation detection unit is a touch sensor.

45. A method of turning on a device of a printing apparatus comprising the device, a display unit which displays an image, a user operation detection unit which detects a user touch operation to the display unit, and a human detection unit which detects a human, the method comprising:

detecting a human;

detecting a user operation to the display unit;

shifting a power state of the printing apparatus from a first power state to a second power state higher power consumption than the first power state based on the detecting the human without turning on the display unit; and shifting the power state of the printing apparatus from the second power state to a third power state higher power consumption than the second power state based on the detecting the user operation to the display unit, wherein a shift of the power state of the printing apparatus from the second power state to the third power state is not performed based on a detection of a human by the human detection unit.

46. The method according to claim 45, wherein a motor of the printing apparatus is not driven on based on a detection of the human.

47. The method according to claim 45, further comprising;

driving a predetermined device of a print unit which prints image on a medium based on the detecting a user touch operation to the display unit.

48. The method according to claim 45, wherein the device is a CPU or a HDD.

* * * * *